United States Patent [19]

Schneider et al.

[11] Patent Number: 5,293,970
[45] Date of Patent: Mar. 15, 1994

[54] CYLINDER INCLUDING A CONTROL VALVE BETWEEN SEPARATE WORK CHAMBERS

[75] Inventors: Steffen Schneider, Tamm-Hohenstange; Paul Nathan, Steinheim a.d. Murr, both of Fed. Rep. of Germany

[73] Assignee: Robert Bosch GmbH, Stuttgart, Fed. Rep. of Germany

[21] Appl. No.: 845,884

[22] Filed: Mar. 4, 1992

[30] Foreign Application Priority Data

Mar. 9, 1991 [DE] Fed. Rep. of Germany ....... 4107600

[51] Int. Cl.$^5$ .......................... F16F 9/46; F16B 15/00; B60G 17/08
[52] U.S. Cl. .................. 188/299; 188/322.15; 251/324
[58] Field of Search ............... 188/282, 285, 289, 299, 188/322.11, 322.13, 322.15, 322.16, 322.22, 316, 317; 137/625.69; 251/324

[56] References Cited

U.S. PATENT DOCUMENTS

| | | | |
|---|---|---|---|
| 4,084,618 | 4/1978 | Gurries | 251/324 X |
| 4,187,884 | 2/1980 | Loveless | 137/625.69 |
| 5,016,908 | 5/1991 | Athanas et al. | 188/299 X |

FOREIGN PATENT DOCUMENTS

| | | | |
|---|---|---|---|
| 0042736 | 4/1981 | Japan | 188/322.15 |
| WO8707565 | 12/1987 | PCT Int'l Appl. | |
| WO8806983 | 9/1988 | PCT Int'l Appl. | |

*Primary Examiner*—Robert J. Oberleitner
*Assistant Examiner*—Josie B. Ballato
*Attorney, Agent, or Firm*—Edwin E. Greigg; Ronald E. Greigg

[57] ABSTRACT

A cylinder including a control slide supported in a piston in a cylinder. The control slide is supported in a slide guide, the slide guide is supported in a valve housing with a play. The provision of the play has the advantage that deformation of the valve housing has no influence on a gap between the control slide and the slide guide. The proposed cylinder is intended in particular for use as a shock absorber for vehicles.

15 Claims, 1 Drawing Sheet

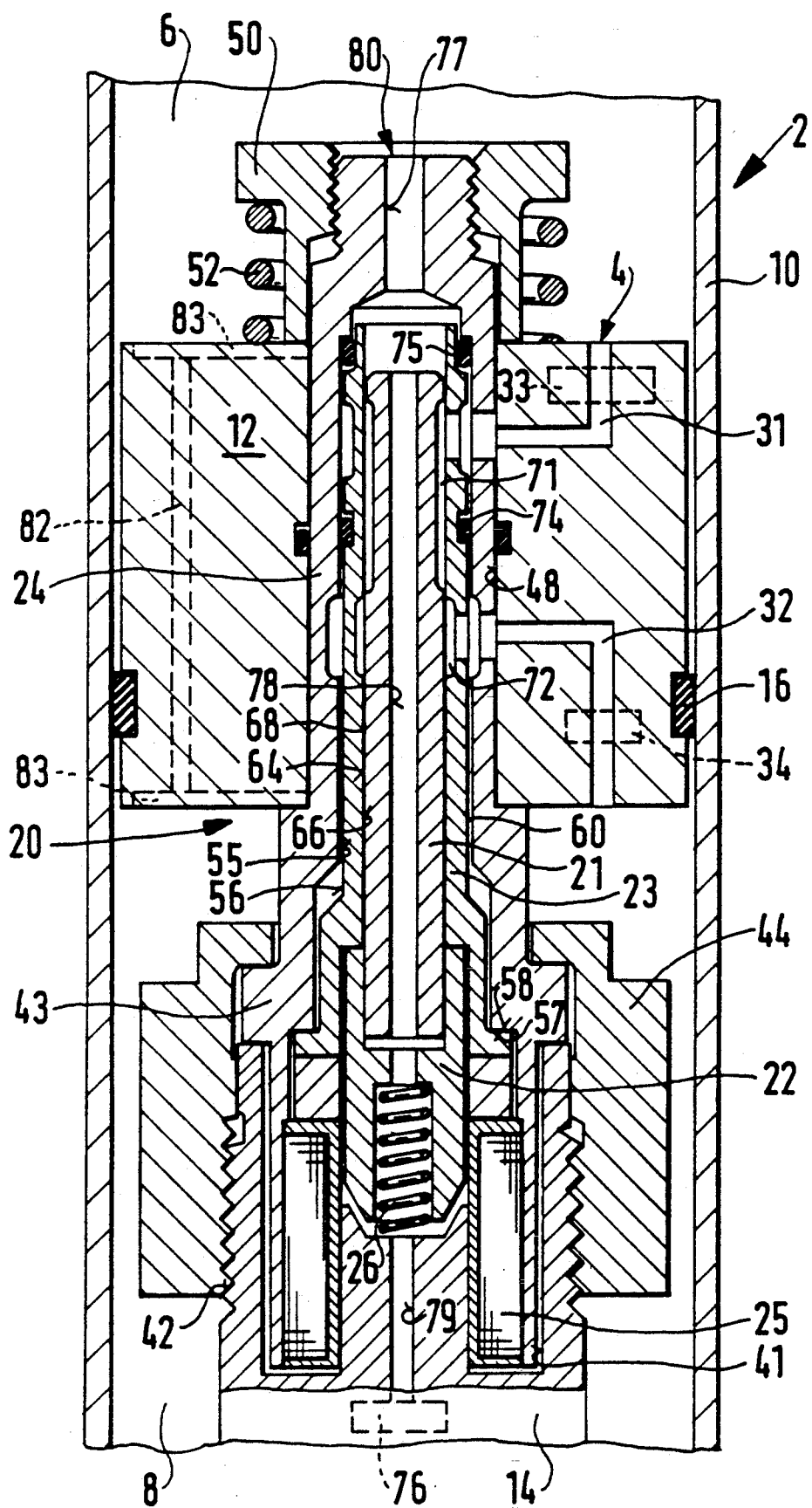

CYLINDER INCLUDING A CONTROL VALVE BETWEEN SEPARATE WORK CHAMBERS

BACKGROUND OF THE INVENTION

The invention relates to a cylinder having a valve device with a control slide.

A cylinder having two work chambers and a hydraulic connection connecting the two work chambers is known. A valve device having a control slide is located in the course of the hydraulic connection. The control slide is supported in a housing. For proper function of the valve device, it is necessary for a very narrow gap to be present between the control slide and the housing. Forces acting upon the housing can deform the housing. The deformation of the housing may be greater than the gap, so that seizing between the control slide and the housing can occur.

OBJECT AND SUMMARY OF THE INVENTION

The cylinder according to the invention has the following advantage, in particular, over the prior art: as a result of the play between the valve housing and the slide guide, deformation of the valve housing can at most be transmitted in attenuated form to the slide guide. Given adequate dimensioning of the play between the valve housing and the slide guide, all the deformations of the valve housing are kept away from the slide guide. In the cylinder of the invention, the gap between the control slide and the slide guide can advantageously be made quite small, without the danger of seizing between the control slide and the slide guide.

The control slide can advantageously be fitted into its slide guide with a particularly narrow gap. Because of the proposed play, the gap can be embodied as especially narrow, which is highly favorable in terms of the hydraulic mode of operation of the valve device.

The cylinder of the invention has other advantageous features as well.

Supporting the slide housing in the valve housing with the aid of elastic elements advantageously produces a particularly simple embodiment. It additionally offers the advantage that with varying deformation of the valve housing, proper support of the slide housing continues to be assured.

The elastic elements for supporting the slide housing can advantageously also perform the function of sealing elements.

Disposing the valve device in the region of the piston produces a particularly simple, space-saving embodiment; the play between the slide guide and the valve housing markedly favors the disposition of the valve device in the region of the piston.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the invention in simplified form.

DESCRIPTION OF THE PREFERRED EMBODIMENT

The drawing shows a cylinder 2 in only fragmentary form, for the sake of simplicity. Only the region of a hydraulic connection 4 between a first work chamber 6 and a second work chamber 8 is shown. The work chambers 6, 8 are shown on only fragmentary form and are located inside a cylinder tube 10, likewise shown in only fragmentary form.

In the exemplary embodiment selected, the hydraulic connection 4 extends through a piston 12. However, the hydraulic connection 4 may also be provided in any other location in the region of the cylinder 2. In the exemplary embodiment shown, both work chambers 6, 8 are located inside the cylinder tube 10. However, it is also possible for at least one of the two work chambers 6, 8 to be located outside the cylinder tube 10. At least one of the work chambers 6, 8 may for instance be a compensation chamber. The compensation chamber may for instance surround the cylinder tube 10, or be embodied as a separate reservoir.

The work chambers 6, 8 contain a pressure fluid. The pressure fluid may be liquid or gaseous, for example. It is also possible for at least one of the work chambers 6, 8 to be filled only partly with the pressure fluid, which for instance is in liquid form, and for the rest of the work chamber 6, 8 to contain a gas.

The piston 12 is secured to a piston rod 14. With the interposition of a seal 16 the piston 12 can slide axially on an inside jacket face of the cylinder tube 10. The piston 12 and cylinder tube 10 are movable relative to one another arbitrarily.

A flow through the hydraulic connection 4 can be controlled or varied with the aid of a valve device 20. The valve device 20 includes a control slide 21 having an armature 22, a slide guide 23, a valve housing 24, an electromagnet 25, and a spring 26.

In the exemplary embodiment shown in the drawing, the first work chamber 6 is located above the piston 12, and the second work chamber 8 is located below the piston 12. Beginning at the first work chamber 6, the hydraulic connection 4 extends through a channel 31, the valve device 20 and a conduit 32, into the second work chamber 8. The conduit 31 connects the valve device 20 to the first work chamber 6, and the conduit 32 connects the valve device 20 to the second work chamber 8. If necessary, a valve 33 may be provided in the conduit 31 and a valve 34 may be provided in the course of the conduit 32.

The electromagnet 25 is firmly connected to the valve housing 24. The armature 22 is connected to the control slide 21. The armature 22 and control slide 21 may instead be embodied in one piece. The control slide 21 is supported axially displaceably in the slide guide 23. The spring 26 acts at one end on the valve housing 24 and at the other in the axial direction upon the armature 22 or control slide 21. Depending on the current to the electromagnet 25, the electromagnet 25 generates a magnetic force that acts axially upon the armature 22 or control slide 21. The magnetic force acting upon the control slide 21 is directed counter to the force of the spring 26 acting upon the control slide 21.

A turned groove 41 is provided on one face end of the piston rod 14. Outside the turned groove 41, the piston rod 14 has a thread 42. The valve housing 24 of the valve device 20 is located partly inside the turned groove 41. A shoulder 43 extending radially is provided on the valve housing 24. With the aid of a union nut 44, the valve housing 24 is screwed to the piston rod 14. The union nut 44 acts upon the shoulder 43 and thus presses the shoulder 43 on its end face against the piston rod 14, so that the valve housing 24 is firmly joined to the piston rod 14. The union nut 44 is screwed onto the thread 42.

The piston 12 has an axially extending central bore 48. The valve housing 24 protrudes through the bore 48. The piston 12 and the valve housing 24 are firmly joined together. This can be done for instance by means of a nut 50 and a spring 52.

The valve housing 24 has a stepped inside contour 55 extending substantially in the actuation direction of the control slide 21. The slide guide 23 has a stepped outer contour 56, likewise extending substantially parallel to the actuation direction of the control slide 21. A substantially radially extending stop face 57 is provided in the course of the inside contour 55 or at the end of the inside contour 55 on the valve housing 24. A stop face 58 is provided in the course of the outside contour 56 or at the end of the outside contour 56 on the slide guide 23. The stop face 58 extends substantially radially. The slide guide 23 is located inside the valve housing 24. The slide guide 23 is built into the valve housing 24 in such a way that the stop face 58 rests on the stop face 57. The inside contour 55 of the valve housing 24 and the diameter of the outer contour 56 of the slide guide 23 are dimensioned such that a play 60 remains in the radial direction between the inside contour 55 and the outside contour 56.

The control slide 21 has an external guide 64. The slide guide 23 has an internal guide 66. The diameters of the guides 64, 66 are manufactured with high precision and are dimensioned such that only a very small gap 68 remains between the guides 64, 66. For hydrostatic, hydrodynamic and control technology reasons, it is important for the gap 68 to be as small as possible. Stringent demands are therefore necessary in terms of roundness and straightness of the cylindrical guides 64 and 66. In other words, it is particularly important that the guide 66 of the slide guide 23 remain straight even if any forces arrive, because otherwise increased friction or seizing between the slide guide 23 and the control slide 21 could occur.

The guide 64 of the control slide 21 is interrupted by a groove 71. A groove 72 interrupts the guide 66 of the slide guide 23. The conduit 31 communicates with the groove 71 via a transverse bore provided in the valve housing 24 and via a transverse bore provided in the slide guide 23. The groove 72 communicates with the conduit 32 via transverse bores provided in the slide guide 23 and in the valve housing 24. Depending on the position of the control slide 21, the groove 71 communicates more or less with the groove 72. In other words, depending on the position of the control slide 21, the hydraulic connection 4 is opened to a variably wide extent. In the exemplary embodiment shown, with the electromagnet 25 currentless the hydraulic connection 4 is closed, while when there is current to the electromagnet 25 the conduits 31, 32 communicate with one another.

There are an elastic element 74 and an elastic element 75 in the course of the play 60 between the slide guide 23 and the valve housing 24. The elastic elements 74, 75 serve as sealing elements. The elastic element 74 prevents a direct communication between the conduit 31 and the conduit 32 through the play 60 between the slide guide 23 and the valve housing 24. The elastic element 75 prevents direct communication between the conduit 31 and one face end of the control slide 21 through the play 60.

A pressure sensor 76, shown in dashed lines in the drawing, is located in the region of the piston rod 14, or inside the piston rod 14. The pressure sensor 76 serves to measure a pressure in the first work chamber 6. An axially extending bore 77 is provided in the valve housing 24. The bore 77 leads from the face end of the valve housing 24 toward the first work chamber 6 into the region of the inside contour 55. A bore 78 extends axially through the control slide 21 and armature 22 and connects the face ends of the control slide 21 and armature 22. A further bore 79 extends through the valve housing 24 and connects the region in which the control slide 21 is located with the pressure sensor 76. A connection 80 thus exists. The connection 80 connects the pressure in the first work chamber 6 to the pressure sensor 76 through the bores 77, 78, 79. For reasons of space, the pressure sensor 76 is disposed in the region of the piston rod 14.

Upon installation of the cylinder and/or during operation of the cylinder 2, deformation of the valve housing 24 can occur. The deformation may have various causes, some of which are listed here by way of example: the valve housing 24 may deform as a consequence of the connection of the valve housing 24 to the piston rod 14 with the aid of the union nut 44. However, the deformation of the valve housing 24 may also originate in the connection of the piston 12 to the valve housing 24. A deformation of the valve housing 24 may also be caused by heat, for example.

In the cylinder 2 embodied according to the invention and having the play 60 between the slide guide 23 and the valve housing 24, deformation of the valve housing 24 is kept away from the slide guide 23. If the play 60 is dimensioned adequately and if the elastic elements 74, 75 are elastic enough, then the slide guide 23 remains dimensionally stable even in the presence of major deformation of the valve housing 24. Even with a very small gap 68, seizing between the control slide 21 and the slide guide 2 is therefore prevented with certainty.

The cylinder 2 according to the invention offers the further advantage that in the selection of materials for the slide guide 23 and valve housing 24, whichever material is best suited can be used, without having to take the valve housing 24 into account when selecting the material for the slide guide 23. Since the slide guide 23 is a tubular structure of relatively constant wall thickness, the guide 66 can be manufactured particularly simply and exactly, and in addition thermal influences on the deformation of the guide 66 are especially slight.

In addition to the hydraulic connection 4, the work chambers 6, 8 of the cylinder 2 can as needed communicate with a further hydraulic connection 82 or a plurality of further hydraulic connections. Since the further hydraulic connection 82 is not absolutely necessary in the cylinder 2 embodied according to the invention, the further hydraulic connection 82 has been shown in dashed lines in the drawing. Further control valves 83 may be provided in the course of the further hydraulic connection 82.

In the drawing, the piston 12 and the valve housing 24 are shown as if they were each made in one piece. For the sake of assembly in particular, one skilled in the art can make these parts separable in an arbitrary manner.

The cylinder tube 10 may for instance be connected to a vehicle body or to one axle of a vehicle. Accordingly, the piston rod 14 is joined to the axle or body of the vehicle. The cylinder according to the invention may in that case be a shock absorber of a vehicle, for instance. The cylinder 2 may for instance be a so-called single-tube or dual-tube shock absorber. In that case, the damping of the shock absorber can be varied with the aid of the valve device 20

The play 60 can advantageously compensate for errors in concentricity of the slide guide 23 with respect to the valve housing 24. It follows that the play 60 is variable over the circumference. Longitudinally as well, the play 60 need not be of equal magnitude everywhere. For instance, the play 60 could be made somewhat larger in the region of critical zones, and somewhat smaller in the region of noncritical zones, or the play 60 could even be dispensed with there.

The number of elastic elements 74, 75 depends primarily upon the number of locations to be sealed off in the course of the play 60. Moreover, still other elastic elements may be provided for the sake of elastically supporting the slide guide 23 with respect to the valve housing 24. The elastic element 74 or 75 is a sealing ring, particularly an O ring, lip seal, and so forth.

The elastic element 74, 75 serves to elastically support the slide guide 23. In the exemplary embodiment shown, the elastic element 74, 75 advantageously also serves as a sealing element. In other exemplary embodiments it is possible that no seal may be needed at the location where the elastic element is disposed; in that case the elastic element serves solely to elastically support the slide guide 23. The elastic element is a metal or plastic spring, for instance.

The exemplary embodiment described shows the cylinder 2 with the valve device 20, the valve device 20 being closed in the currentless state. This is purely by way of example. A valve device that is open in the currentless state and that is closed by the application of current is equally possible. Any other switching function is also possible.

The valve device 20 may also include a seat valve, where instead of the control slide 21 a control slide is provided that is actuatable more or less toward a valve seat with the aid of an electromagnet or a spring.

The mechanical connection between the piston 12 and the piston rod 14 can be done in various ways. In an exemplary embodiment of the invention in which the union nut 44 is absent, for instance, at least some of any deformation that may occur is kept away from the slide guide 23 advantageously with the aid of the play 60.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A cylinder (2) having a cylinder tube (10) and having a piston (12) displaceably supported in the cylinder tube (10), and having a valve device (20) with an actuatable control slide (21) guided by a slide guide (23) having a longitudinal length, wherein the slide guide (23) is fixedly supported in a valve housing (24) against axial movement, and a play (60) formed by a radial spacing along at least substantially the longitudinal length of said slide guide is present between the slide guide (23) and the valve housing (24), which upon a deformation of the valve housing (24) any place along said radial spacing keeps this deformation away from the slide guide (23).

2. A cylinder as defined by claim 1, in which the play (60) extends transversely to an actuation direction of the control slide (21).

3. A cylinder as defined by claim 2, in which the the valve device (20) is disposed in the region of the piston (12).

4. A cylinder as defined by claim 2, in which the slide guide (23) is radially supported in the valve housing (24) with the aid of at least one elastic element (74, 75).

5. A cylinder as defined by claim 4, in which the elastic element (74, 75) is a sealing element.

6. A cylinder as defined by claim 2, in which the cylinder (2) is a shock absorber of a vehicle, and the valve device (20) serves to vary a damping force of the cylinder.

7. A cylinder as defined by claim 1, in which the the valve device (20) is disposed in the region of the piston (12).

8. A cylinder as defined by claim 7, in which the slide guide (23) is radially supported in the valve housing (24) with the aid of at least one elastic element (74, 75).

9. A cylinder as defined by claim 8, in which the elastic element (74, 75) is a sealing element.

10. A cylinder as defined by claim 7, in which the cylinder (2) is a shock absorber of a vehicle, and the valve device (20) serves to vary a damping force of the cylinder.

11. A cylinder as defined by claim 1, in which the slide guide (23) is radially supported in the valve housing (24) with the aid of at least one elastic element (74, 75).

12. A cylinder as defined by claim 11, in which the elastic element (74, 75) is a sealing element.

13. A cylinder as defined by claim 12, in which the cylinder (2) is a shock absorber of a vehicle, and the valve device (20) serves to vary a damping force of the cylinder.

14. A cylinder as defined by claim 11, in which the cylinder (2) is a shock absorber of a vehicle, and the valve device (20) serves to vary a damping force of the cylinder.

15. A cylinder as defined by claim 1, in which the cylinder (2) is a shock absorber of a vehicle, and the valve device (20) serves to vary a damping force of the cylinder.

* * * * *